United States Patent [19]
Yu

[11] Patent Number: 5,899,687
[45] Date of Patent: May 4, 1999

[54] CONVEYING SYSTEM FOR A CONTINUOUS-TYPE OVEN

[75] Inventor: Ming-Hui Yu, Tao-Yuan Shien, Taiwan

[73] Assignee: Tangteck Equipment, Inc., Tao-Yuan Shie, Taiwan

[21] Appl. No.: 08/957,702

[22] Filed: Oct. 24, 1997

[51] Int. Cl.$^6$ .................................................... F27B 9/00
[52] U.S. Cl. .................... 432/121; 432/162; 432/124; 432/243
[58] Field of Search .................................. 432/121, 162, 432/168, 171, 261, 239, 243, 124; 198/817, 848

[56] References Cited

U.S. PATENT DOCUMENTS

| | | | |
|---|---|---|---|
| 1,857,206 | 5/1932 | MacDougall | 432/243 |
| 4,834,649 | 5/1989 | Levit et al. | 432/162 |
| 4,874,081 | 10/1989 | Kondo | 198/817 |
| 4,979,358 | 12/1990 | Keip | 198/817 |

*Primary Examiner*—Teresa Walberg
*Assistant Examiner*—Jiping Lu

*Attorney, Agent, or Firm*—Rosenberg, Klein & Bilker

[57] ABSTRACT

A conveying system for use in a continuous-type oven is provided. The conveying system comprises a machine unit on which are disposed at least a pair of opposed carriers spaced apart by a predetermined separation distance. The subject conveying system also comprises a mesh conveyor belt displaceably coupled to the machine unit in an endless loop configuration, about an axis directed substantially parallel to a longitudinal plane defined by the machine unit. The subject conveying system further comprises at least a pair of chain conveyor assemblies coupled to the machine unit, each including: a rail coupled to at least one of the carriers to be suspended thereby over the mesh conveyor belt; and, at least a pair of chain wheels coupled adjacent the opposing ends of the rail to rotate about respective axes of rotation transversely directed relative to the longitudinal plane. Each chain conveyor assembly also includes a chain engaging the chain wheels so as to advance thereabout through an endless loop. The chain is provided with a plurality of links having formed thereon a flanged carrying portion that extends laterally over the mesh conveyor belt.

5 Claims, 7 Drawing Sheets

CONVEYING SYSTEM FOR A CONTINUOUS-TYPE OVEN

BACKGROUND OF THE INVENTION

The subject invention relates to a conveyance structural improvement of continuous type heating oven, particularly to one that will effectively avoid the occurrence of dropping plate, jamming plate, clamped plate, etc.

Surface mount technology has improved on many weaknesses in the conventional type of penetrated-hole circuit board, application of such technology has reduced the cubic measurements of a product, increased its density, saved manpower and achieved the precision that could not be performed by manpower, therefore, it is highly commended by the manufacturing industry, many peripheral equipment have been introduced since, such as surface adhering components, positioning machine, spot welder, soldering furnace, etc.

Conventionally, a continuous type heating oven is designed to achieve welding purposes by heating the SMD component pins, solder and working piece with a heater. A conventional type of continuous heating oven involves a proper conveyance unit, which serves to convey a printed circuit board (PCB) through the heater in the machine unit to enable welding operation, the conveyance structure of a conventional type of continuous heating oven is shown in FIG. 1, said conveyance unit comprises a mesh conveyor belt 1A and a chain conveyor unit 2A, said mesh conveyor belt 1A and the chain conveyor unit 2A are respectively driven by a driving mechanism to perform continuous conveyance, a foundation plate may be carried on the two sides between the two chains of the chain conveyor unit 2A, the mesh conveyor belt 1A may serve to take up the foundation plate that drops by accident, or to carry a foundation plate with a smaller area.

However, in the conveyor unit of said conventional type of continuous heating oven, the chain conveyor unit 2A is installed on the surrounding of the mesh conveyor belt 1A, therefore, the length of the mesh conveyor belt 1A must be shorter than the chain conveyor unit 2A, therefore, there shall be a clearance below the two ends of the chain conveyor unit 2A without the equipment of the mesh conveyor belt 1A, and, to avoid close contact between the mesh conveyor belt 1A and the chain conveyor unit 2A during the operation, there must be a specified distance between the two parts, but such requirement shall lengthen the clearance L below the two ends of the chain conveyor unit 2A where there is no mesh conveyor belt 1A, such occurrence of said clearance L will easily cause the conveying foundation plate to drop from the output, or jam or clamped in said clearance, and such occurrence of dropping plate, jamming plate or clamped plate has been regarded by the manufacturers as a major defect. Moreover, the axis of the chain wheel of the chain conveyor unit 2A is in horizontal arrangement, while the chains' conveyance is in vertical takeover arrangement, and at the sides of the chains are the extensions of carrying protrusions, to carry the foundation plate or other objects to be conveyed on two sides, in such an operation, the foundation plate will easily jam between the carrying protrusions, and at the input end where the takeover process is performed the plate will easily be clamped, moreover, the chains carry the load of the foundation plate merely with the carrying protrusions, therefore, the foundation plate will be supported by the carrying protrusions only horizontally, as a result, the foundation plate will not be steadily conveyed on the chains.

Therefore, in the sense of actual applications, the conveyor unit of said conventional type of continuous heating oven does involve inconveniences and weaknesses that need further improvement.

In view of effective improvement of the above, the subject inventor has devoted intensive study, with technical applications, and has finally presented the reasonably designed subject invention with effective improvement of the above weaknesses.

SUMMARY OF THE INVENTION

The primary objective of the subject invention is to present a type of conveyance structural improvement of continuous type heating oven, by installing the chain conveyor unit above the mesh conveyor belt, and with the adoption of horizontal takeover conveyance, so the length of the mesh conveyor belt is not restricted, therefore, the output end of the mesh conveyor belt can be flush with the output end of the chain conveyor unit, so that the clearance at the output of the mesh conveyor belt and the chain conveyor unit can be eliminated completely, thus effectively avoiding the occurrence of dropping plate, jamming plate, or clamped plate, etc.

To achieve the above objective, the subject invention presents a type of conveyance structural improvement for continuous type heating oven, said conveyance unit comprises a mesh conveyor belt and a chain conveyor unit, said mesh conveyor belt and chain conveyor unit are driven by a driving mechanism to perform continuous conveyance, the mesh conveyor belt is connected between the rollers at two ends, and is connected with the driving mechanism to deliver the driving force to operate the mesh conveyor belt, the main structure involves the installation of the chain conveyor unit above the mesh conveyor belt, with horizontal takeover conveyance, said chain conveyor unit comprises two chains, said two chains are connected between the chain wheels at two ends, and are connected with driving mechanism to transmit driving force, so the chain conveyor unit will perform its operation, the axis of the chain wheel connected to two ends of the chain is in vertical arrangement, so the chain performs conveyance by horizontal takeover method, the two chains and the chain wheels are located in the two rails, said two rails are horizontally installed above the mesh conveyor belt, the two rails are supported and fixed on the carrier, so the distance of the two rails can be properly adjusted by a bolt, on the sides of the two chains inside the two rails are horizontally protruding carrying edges that serve to carry the foundation plate on two sides, the mesh conveyor belt may serve to take up a foundation plate that drops by accident, or to carry the foundation plate with a smaller area.

The design method and the performance to achieve the above objective and configuration are described below with drawings of the embodiment of the subject invention:

| Brief Description of Numerals | | | |
|---|---|---|---|
| 10 | machine unit | 11 | circuit control box |
| 12 | heater | 13 | mesh conveyor belt |
| 14 | chain conveyor unit | 15 | driving mechanism |
| 16 | roller | 17 | roller |
| 18 | roller | 19 | roller |
| 20 | positioning wheel | 21 | shaft |
| 22 | jut | 23 | chain |
| 24 | chain wheel | 25 | chain wheel |
| 26 | rail | 27 | bolt |
| 28 | hand wheel | 29 | carrier flange |
| 30 | output | 31 | output |
| 32 | carriers | 33 | cover |
| 34 | support | | |

DETAILED DESCRIPTION OF PREFERRED EMBODIMENT

Figure 1:
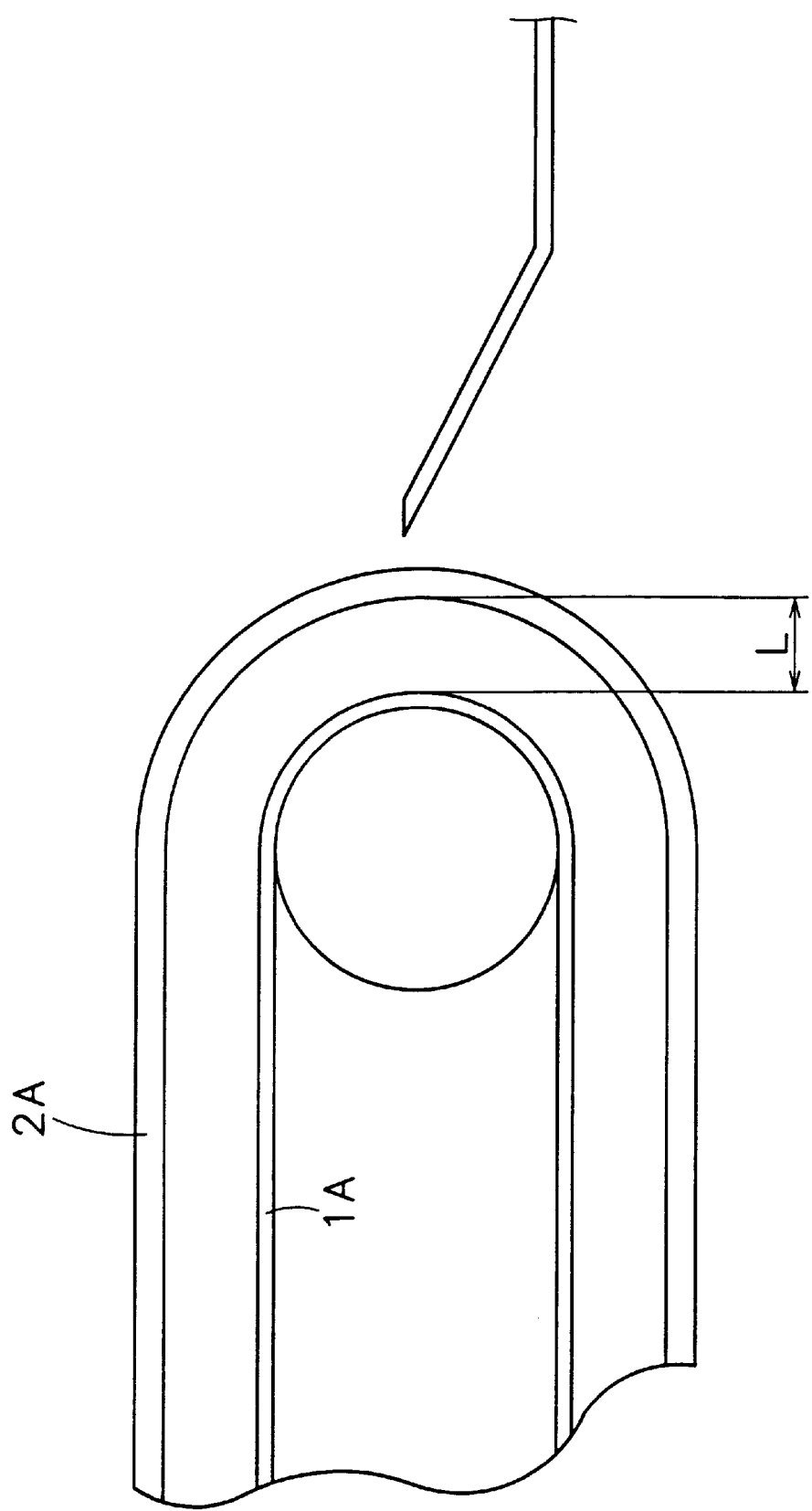
FIG. 1 is an illustration of the output of the conveyance unit of a prior art of continuous type heating oven.
Figure 2:
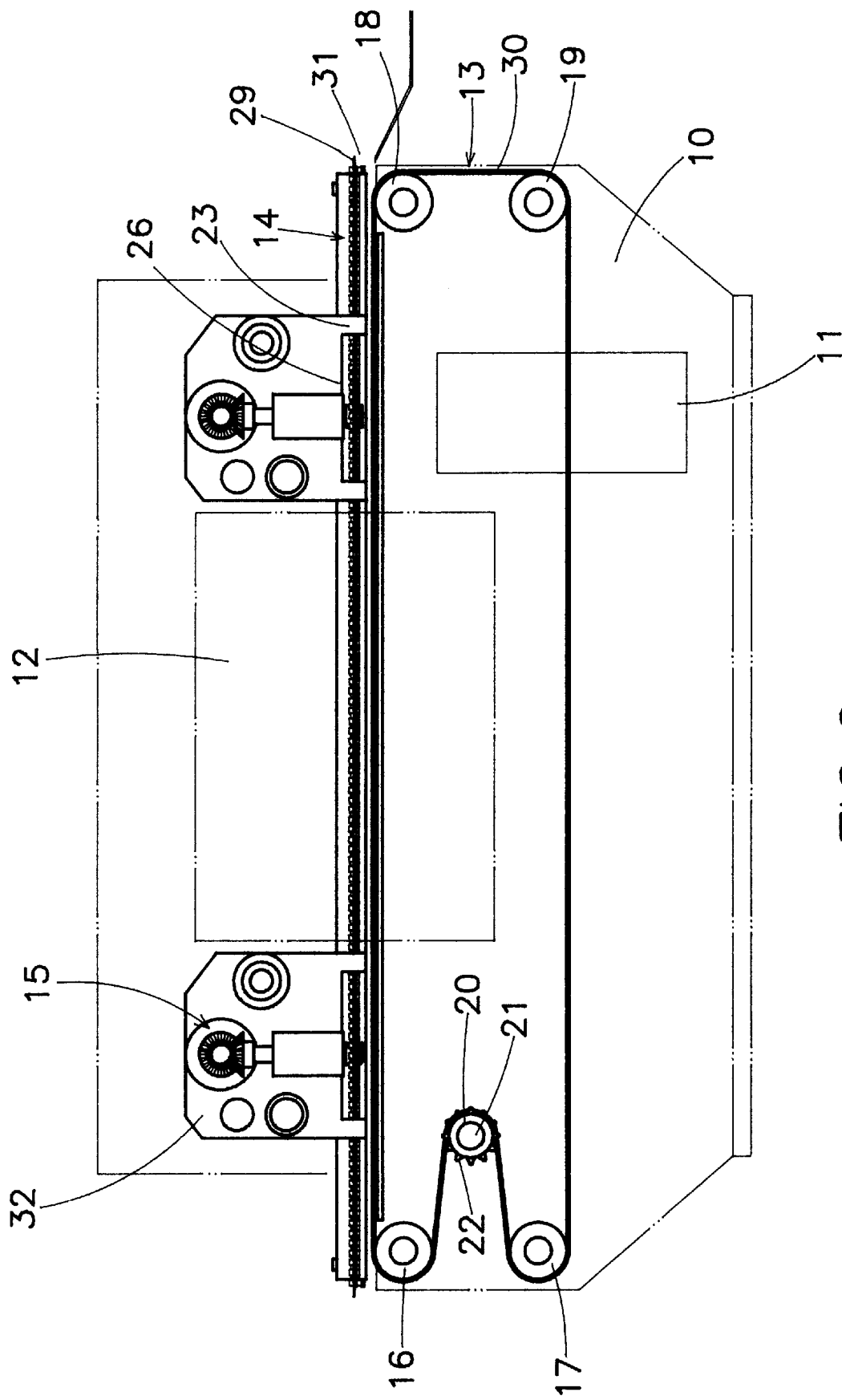
FIG. 2 is a plan view of the subject invention of continuous type heating oven.
Figure 3:
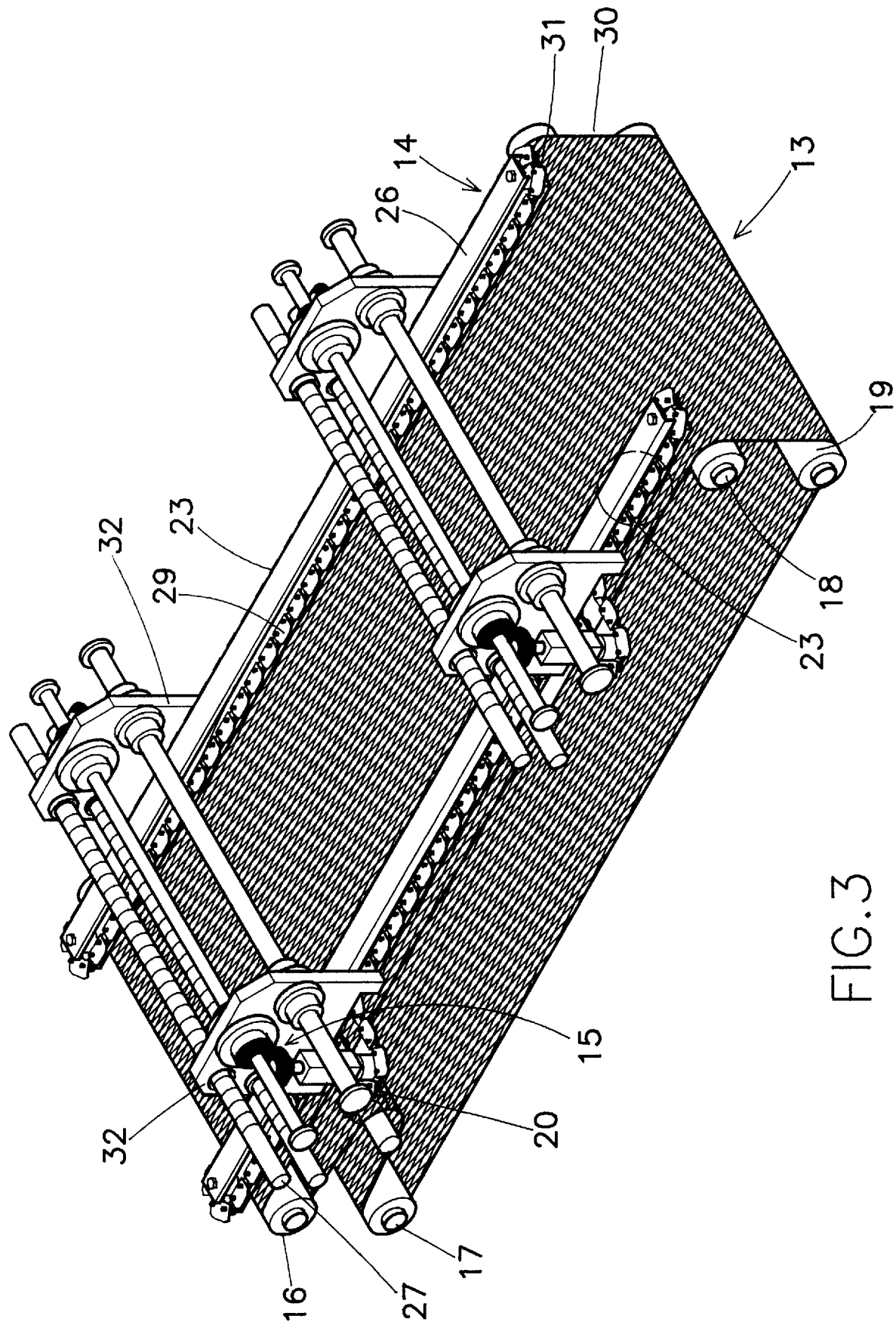
FIG. 3 is a perspective view of the subject invention of conveyance unit.
Figure 3A:
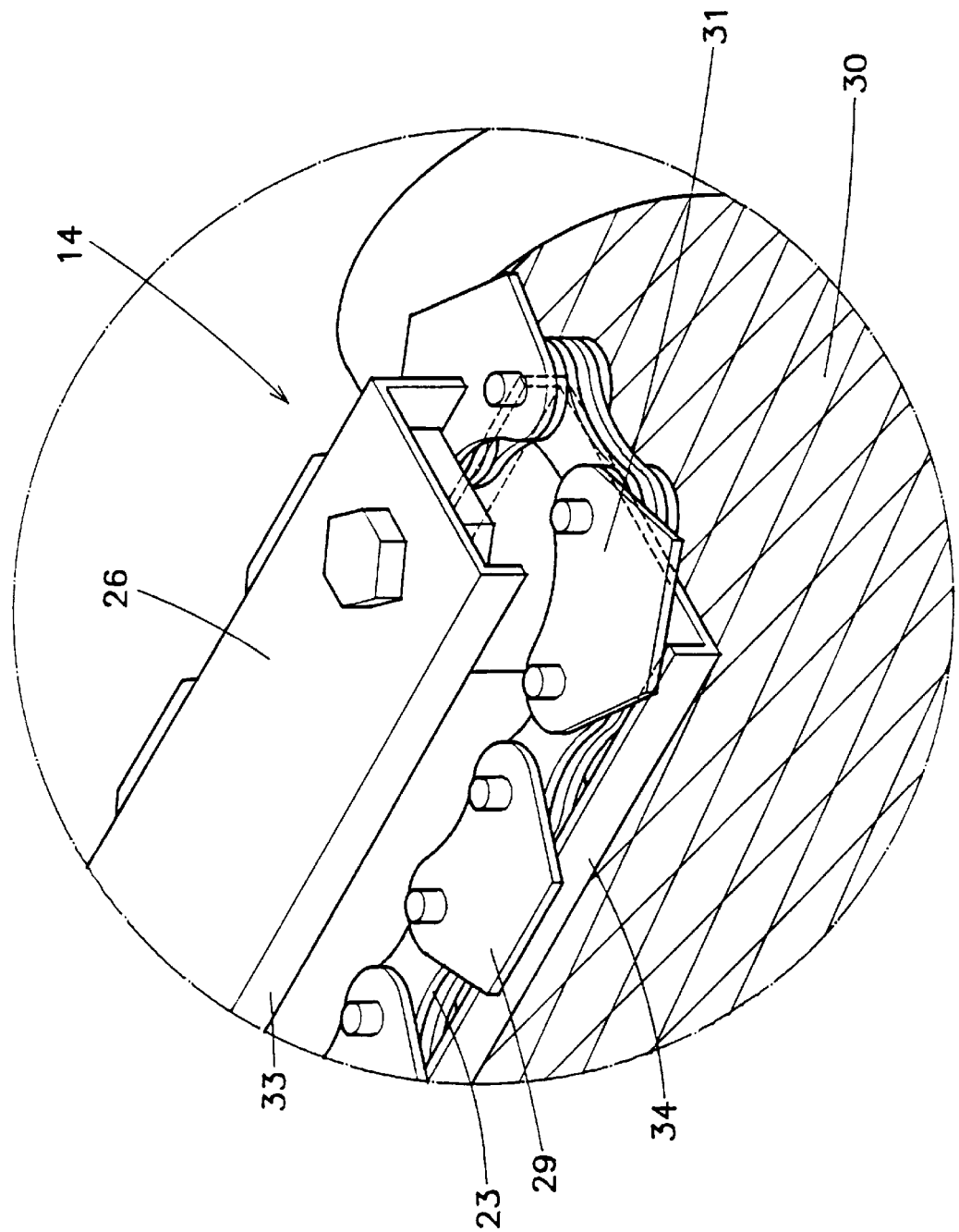
FIG. 3A is a perspective view, partially cut-away, of a first portion of the conveyance unit shown in FIG. 3 in enlarged detail.

Please refer to FIGS. 2 and 3 which are respectively a plan view of the subject invention of continuous type heating oven and a perspective view of the conveyance unit. The subject invention relates to a structural improvement of continuous type heating oven, said continuous heating oven comprises a machine unit 10, said machine unit 10, a solid frame structure used to support and join the linking components, can be put on the floor, on the side or other appropriate location of the machine unit 10 is a circuit control box 11 serving to perform appropriate control of the heater 12 and the conveyance unit, said heater 12 is located at an appropriate location over or below the conveyance unit, serving to heat the conveying foundation plate on the conveyance unit, to facilitate welding operation. Since said machine unit 10 and the heater 12 are generally the same as conventional versions that are beyond the intent of the subject claim, they need no elaboration.

The subject invention relates primarily to an improvement on the conveyance unit in a continuous type heating oven, said conveyance unit comprising a mesh conveyor belt 13 and a chain conveyor unit 14, said mesh conveyor belt 13 and the chain conveyor unit 14 are connected to the driving mechanism and motor (not shown in drawing) that are generally composed of gears, belts or chains, etc., the driving force from the driving mechanism will enable continuous conveyance by the mesh conveyor belt 13 and the chain conveyor unit 14.

The mesh conveyor belt 13 is a net type conveyor carrier made of metal, said mesh conveyor belt 13 is connected to the driving rollers 16, 17, 18 and 19 that are located at two ends, both ends of said rollers 16, 17, 18 and 19 are fixed on the machine unit 10 and are rotating freely. On one end of said mesh conveyor belt 13 is a positioning wheel 20, said positioning wheel 20 is fixed onto a shaft 21, two ends of the shaft 21 are fixed onto the machine unit 10 and are rotating freely. On the surface of each positioning wheel 20 are a number of juts 22 that correspond with the meshes on the mesh conveyor belt 13, said juts 22 that may be inserted into the meshes of the mesh conveyor belt 13 are fixed onto the shaft 21 of the positioning wheel 20, with one end joined by appropriate driving unit to a motor (not shown in drawing), so that the positioning wheel 20 serves as the driving wheel to deliver transmission force to enable conveying operation to the mesh conveyor belt 13, and by means of the juts 22 on the positioning wheel 20, it will avoid any lateral displacement whenever the mesh conveyor belt 13 is operating.

Figure 4:
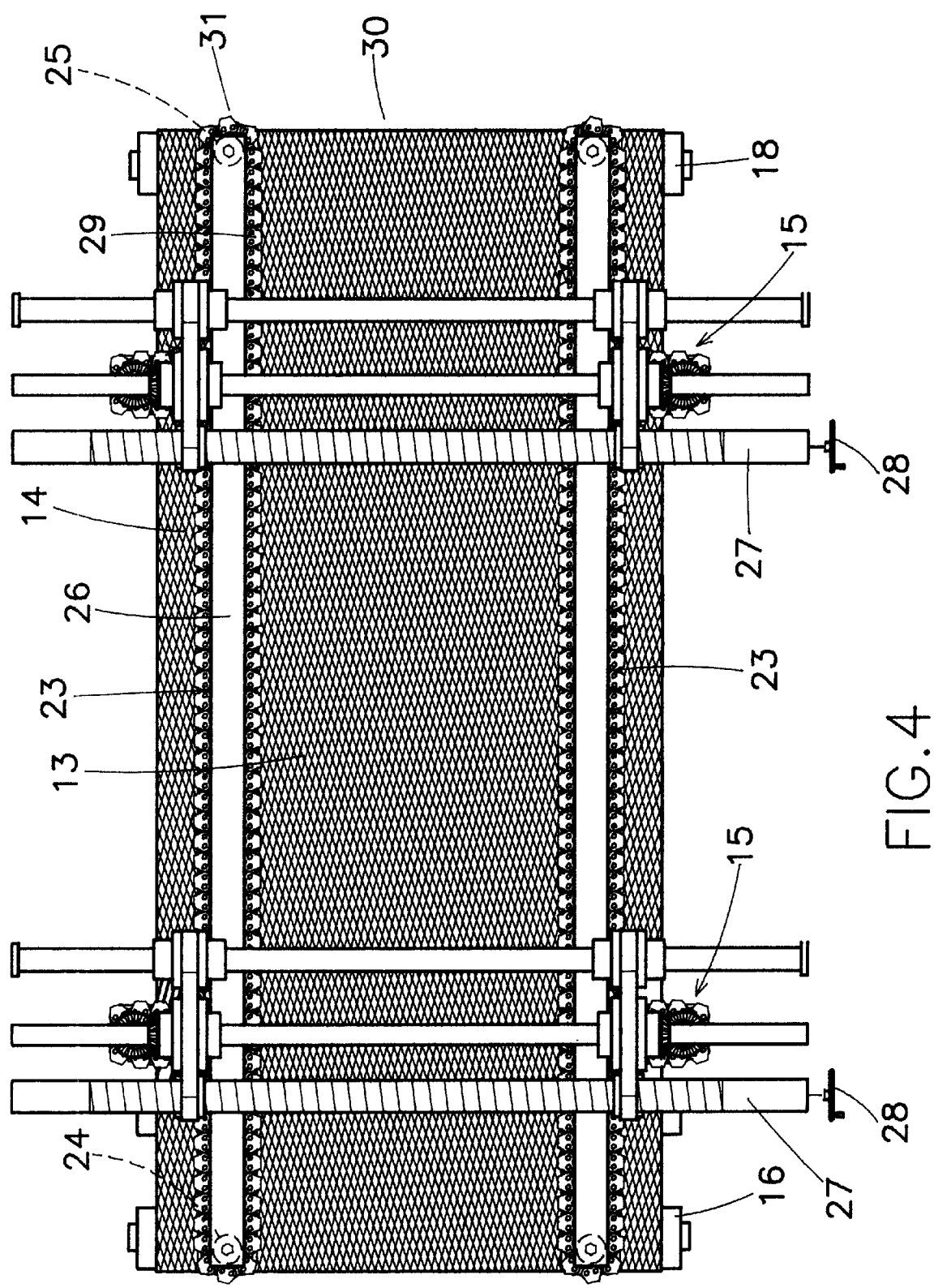
FIG. 4 is a top view of the subject invention of conveyance unit.

The chain conveyor unit 14 is located above the net mesh conveyor belt 13, said chain conveyor unit 14 comprises two pieces of chain 23, each of said two chains 23 is respectively connected to between the chain wheels 24 and 25 at two ends (please refer to FIG. 4), and is connected to the driving unit 15, to deliver motor driving force to make the two chains 23 of the chain conveyor unit 14 to rotate, the axes of said chain wheels 24 and 25 are perpendicular to each other, the two chains 23 and chain wheels 24 and 25 are respectively located in the two rails 26 that run horizontally on the left and right sides, the two rails 26 are located above the mesh conveyor belt 13, at a specified distance above the mesh conveyor belt 13, so that they will not hinder the normal operation of the mesh conveyor belt 13, and the front and rear ends of the two rails 26 are supported and fixed onto the two carriers 32, the distance of the two rails 26 can be respectively adjusted properly by the driving bolts 27 that penetrate the top parts of the two carriers 32, on each end of the two bolts 27 respectively is a hand wheel 28 to enable the turning of the driving bolts 27, to adjust and control the distance of the rails 26, or the turning of the driving bolts 27 may be controlled by electric power or other method, to adjust and control the distance of the two rails 26. For stabilizing support, a cover 33 and support 34 are provided, respectively, above and below each rail 26.

Figure 6:
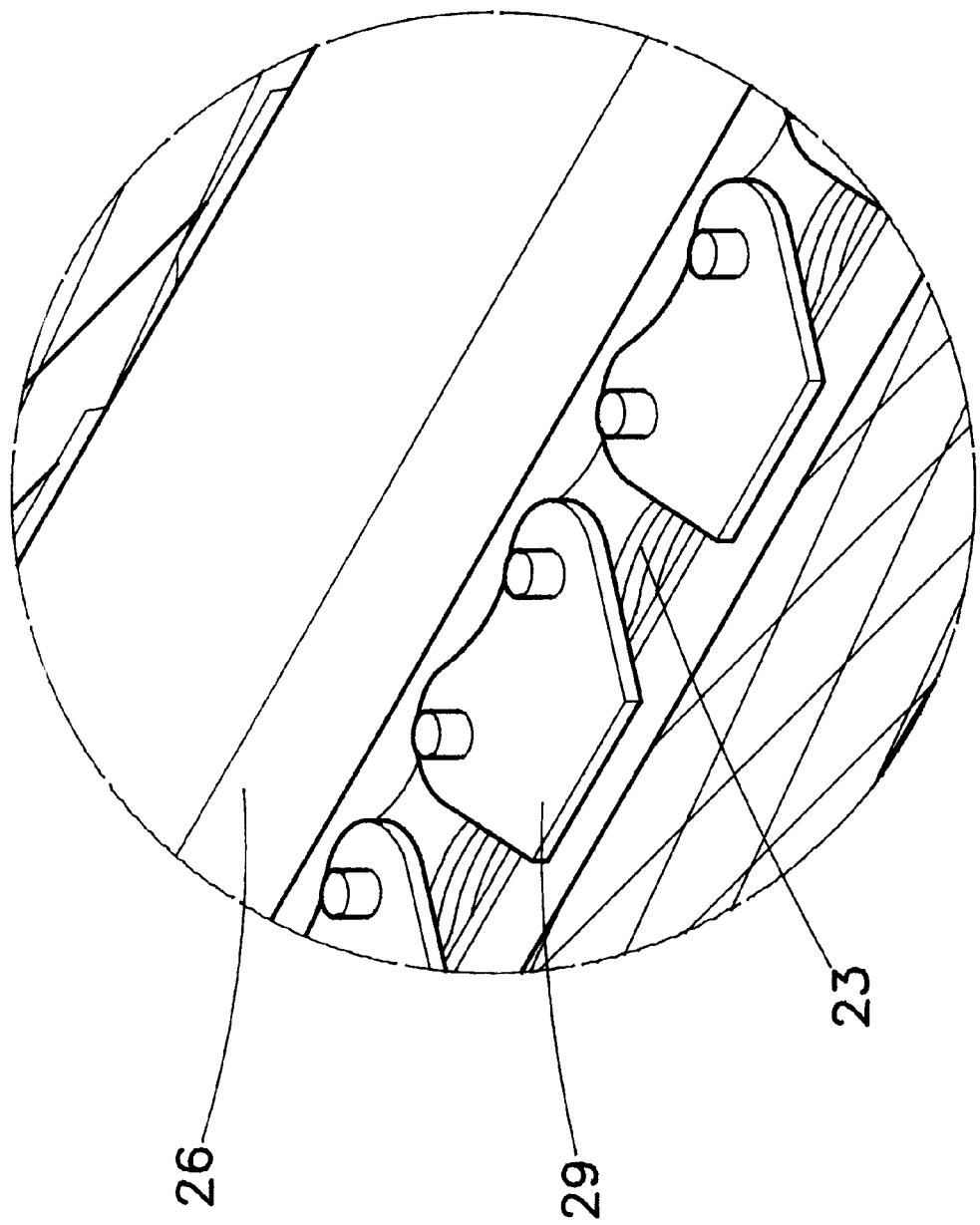
FIG. 6 is a perspective view, partially cut-away, of a second portion of the conveyance unit shown in FIG. 3 in enlarged detail.

On the side of each section of the two chains 23 in the rails 26 is the extension of carrying protrusion 29 (as shown in FIG. 6), said carrying protrusion 29 is horizontal, the carrying protrusions 29 on the inside of the two chains 23 serve to carry the foundation plate to be delivered on two sides, the mesh conveyor belt 13 serves to take up a foundation plate that drops by accident, or for the purpose of a foundation plate with a smaller area, in case of a foundation plate with a larger area or with several sections, the conveyance by the chain conveyor unit 14 will result in deformation, in case of such products, the mesh conveyor belt 13 may be used for the conveying purposes.

Figure 5:
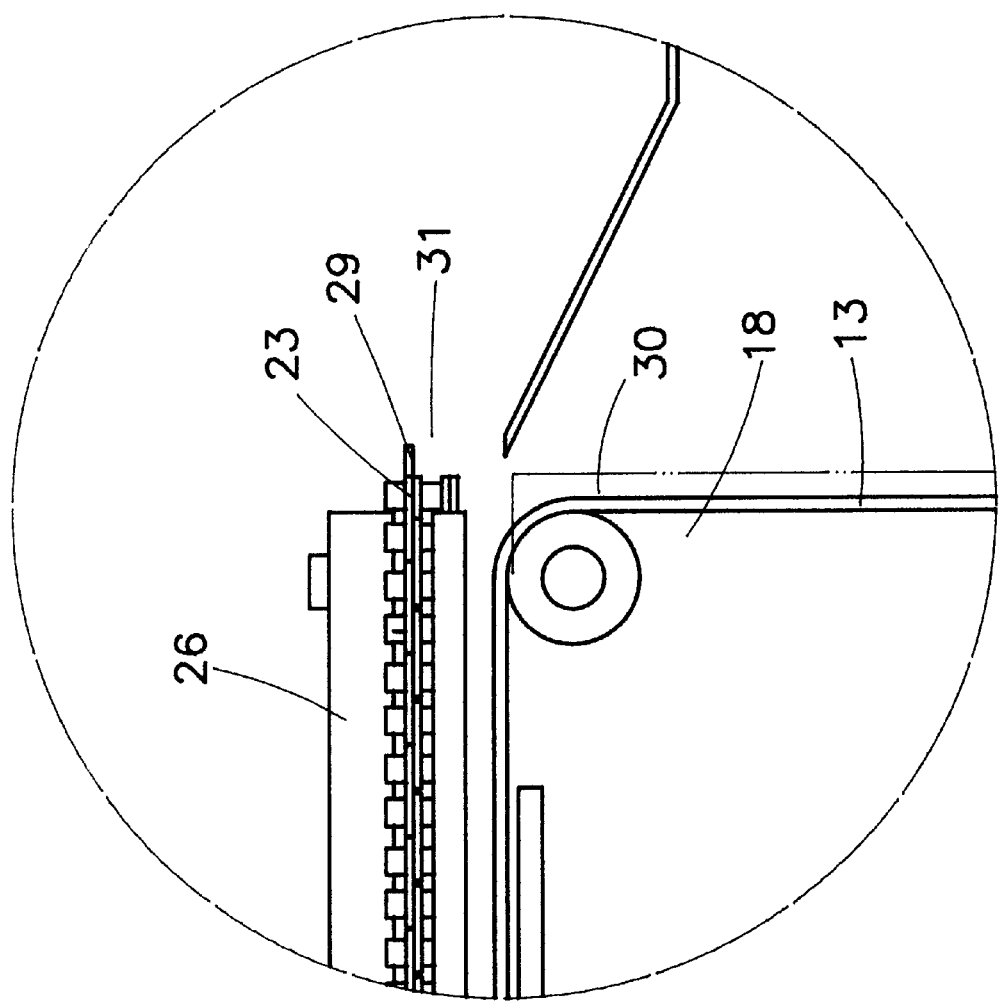
FIG. 5 is a plan view of the output of the subject invention of conveyance unit.

In the subject invention, the chain conveyance unit 14 is fitted above the mesh conveyor belt 13, and the chains perform the conveyance by horizontal takeover method, so the length of the mesh conveyor belt is not restricted, and the clearance produced by the outputs 30 and 31 of the mesh conveyor belt 13 and the chain conveyor unit 14 can be eliminated completely (as shown in FIG. 5), so as to effectively avoid the occurrence of dropping plate, jamming plate or clamped plate, and to facilitate the formation of on-line operation, without an additional worker being appointed to the job of placing the foundation plate, and the foundation plate is not easily inserted between the carrying protrusions 29 on the chain 23, the foundation plate may simultaneously obtain the horizontal support from the carrying protrusions 29 and the vertical support from the protruding key of the chain 23, so that the foundation plate will have more stable conveyance on the chains.

Summing up, the subject invention, with effective improvement on the weaknesses in the conventional conveyance structure of continuous type heating oven, such as frequent occurrences of dropping plate, jamming plate, clamped plate, etc., is an unprecedented version, and with its originality and inventive step that will fully satisfy the qualifications of a patent right, hence this application is filed in accordance with the Patent Law, to protect the subject inventor's rights and interests.

It is declared that the above description, covering the preferred embodiment of the subject invention, shall not be based to limit or restrict the subject claim, and that all equivalent structural or configurational variations or modifications, deriving from the subject description and contents of drawings shall reasonably be included in the subject claim.

I claim:

1. A conveying system for a continuous-type oven comprising:
  (a) a machine unit defining a longitudinal plane, said machine unit having at least a pair of opposed carrier portions spaced one from the other by a predetermined separation distance, each said carrier portion extending in a direction transverse to said longitudinal plane;
  (b) a mesh conveyor belt displaceably coupled to said machine unit, said mesh conveyor belt forming an endless loop adapted for advancement about an axis directed substantially parallel to said longitudinal plane; and,
  (c) at least a pair of chain conveyor assemblies coupled to said machine unit, each said chain conveyor assembly including:
    (1) a rail coupled to at least one of said carrier portions to be suspended thereby over said mesh conveyor belt, said rail having opposed first and second ends;
    (2) at least a pair of chain wheels rotatably coupled to said rail respectively adjacent said first and second ends thereof, said chain wheels each having an axis of rotation transversely directed relative to said longitudinal plane; and,
    (3) a chain engaging said chain wheels to form an endless loop adapted for advancement thereabout.

2. The conveyor system as recited in claim 1 wherein said predetermined separation distance of said opposed coupling portions is adjustable.

3. The conveyor system as recited in claim 2 wherein said machine unit includes at least two pairs of said opposed coupling portions.

4. The conveyor system as recited in claim 1 wherein each said chain of said chain conveyor assemblies includes a plurality of links having a flanged carrying portion extending laterally over said mesh conveyor belt.

5. The conveyor system as recited in claim 1 wherein said chain conveyor assemblies each further include longitudinally extended cover and support members coupled to said rail stabilizing support thereof.

* * * * *